United States Patent [19]
Buchner

[11] 3,955,915
[45] May 11, 1976

[54] THERMAL TREATMENT OF GRANULAR OR LUMPY MATERIAL, PARTICULARLY FIRING LIME, DOLOMITE, MAGNESITE OR THE LIKE

[75] Inventor: Heinrich Buchner, Niederkassel, Germany

[73] Assignee: Klöckner-Humboldt-Deutz Aktiengesellschaft, Cologne, Germany

[22] Filed: Dec. 23, 1974

[21] Appl. No.: 536,933

[30] Foreign Application Priority Data
Dec. 24, 1973   Germany............................ 2364626

[52] U.S. Cl................................. 432/17; 432/19; 432/96
[51] Int. Cl.² ......................................... F27B 15/18
[58] Field of Search ................... 432/17, 19, 25, 26, 432/28, 95, 96, 9

[56] References Cited
UNITED STATES PATENTS

| | | |
|---|---|---|
| 3,285,590 | 11/1966 | Parsons................................. 432/99 |
| 3,355,158 | 11/1967 | Campbell et al...................... 432/99 |
| 3,544,090 | 12/1970 | Peeters ................................. 432/95 |

*Primary Examiner*—John J. Camby
*Attorney, Agent, or Firm*—Hill, Gross, Simpson, Van Santen, Steadman, Chiara & Simpson

[57] ABSTRACT

In vertical continuous furnace calcining of lime, dolomite, magnesite, or the like, part of the air which is introduced at the lower end of the furnace chamber is drawn off in the area of the cooling zone within the chamber and is then reintroduced in encompassing relation into the material column in the firing zone within the furnace chamber and which is located immediately above the cooling zone, the remainder of the air flowing up through the column of material being treated in the chamber. Cleaning of the withdrawn cooling air and addition of fresh air are provided for.

35 Claims, 1 Drawing Figure

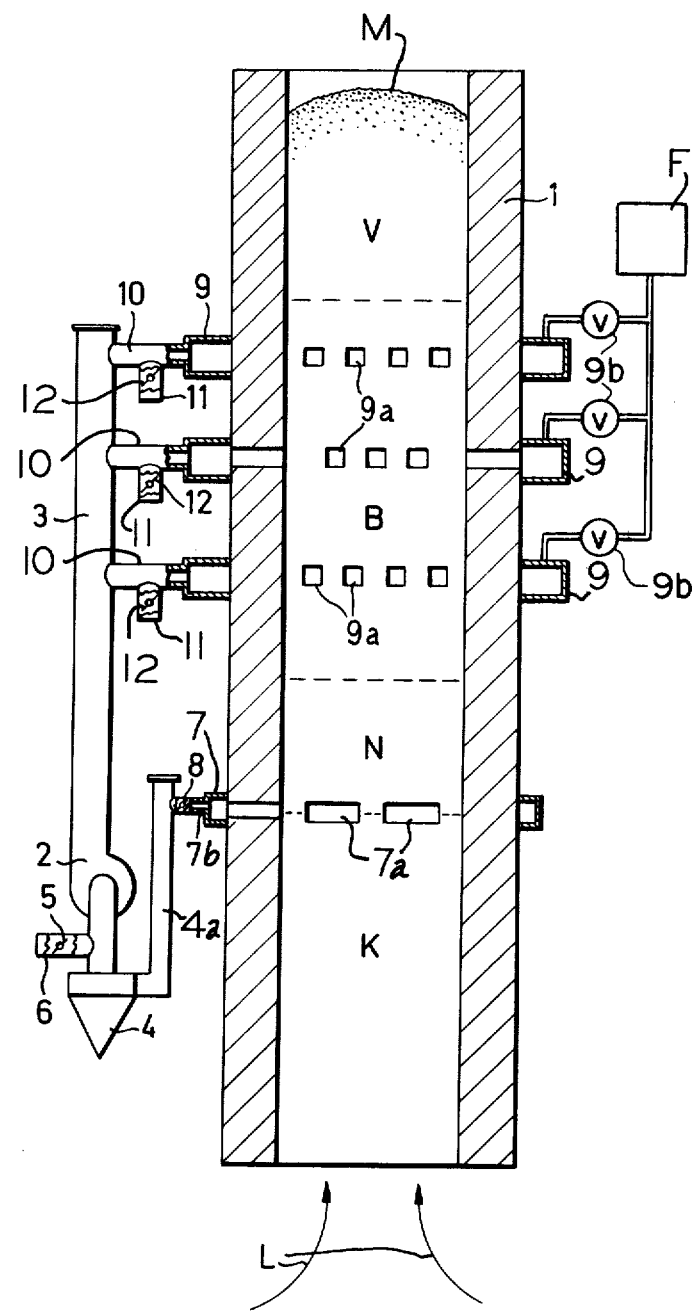

THERMAL TREATMENT OF GRANULAR OR LUMPY MATERIAL, PARTICULARLY FIRING LIME, DOLOMITE, MAGNESITE OR THE LIKE

This invention relates to thermal treatment of granular of lumpy material, particularly firing, e.g., calcining, lime, dolomite, magnesite or the like, and is more particularly concerned with an arrangement wherein firing is effected in a vertical furnace provided with feeding means for the fuel and cooling and firing zones within the furnace chamber in which the flow of material to be treated is downwardly within the chamber and the flow of gases is upwardly within the chamber.

In the thermal treatment of granular and/or lumpy material, and in particular during the firing of lime, dolomite, magnesite or other carbonate containing material in a vertical furnace, it is necessary to supply the material being treated with the required processing heat in accordance with processing requirements in such manner that the end product of material on discharge from the furnace has the required qualities. For this purpose, the techniques of the process must be controlled in the furnace to consume as little fuel as possible and heat losses must be avoided, all within satisfactory parameters to attain the greatest efficiency and provide firing treated, e.g., calcined, material within satisfactory economic limits.

Having regard to the prior art, German Pat. No. 944,479 discloses a method for the firing or sintering of limestone or other cabonates in a vertical furnace of the type mentioned above, wherein for increasing the degree of thermal efficiency, hot discharge gas is removed from the upper area of the firing zone, is mixed with cooler combustion gas and thereafter guided back through a flower into a lower area of the combustion zone. Material to be treated moving through the furnace chamber is charged at the discharge end of the furnace chamber with cold combustion-promoting air and the entire volume of air is forced through the respective treatment zones in the furnace, so that substantial losses in flow velocity will result which can only be compensated by increased blower performance. Disadvantages inherent in this arrangement are that since the combustible gas is directed into the lower end of the firing or combustion zone, and moving upward in the furnace chamber tends to move upward substantially at the perimeter of the furnace chamber due to the generally silo condition of the bulk material column. Thereby, the required processing heat is unfavorably distributed and there is the dangerous possibility of regional overheating and/or underheating of the material being treated.

In German Pat. No. 1,142,308, there is described a method purporting to improve the quality of the product and performance of the furnace supplied with limestone or dolomite, whereby the required combustion air is heated on the one hand in the cooling zone of the furnace, and on the other hand outside of the furnace in a separately operated air heater. It is there alleged that by the use of "refined heat" which is provided outside of the furnace a better deacidizing of the lime material is achieved. However, the generating of additional heat energy in auxiliary apparatus largely precludes economic use of that proposed method.

It is therefore an important object of the present invention to avoid the problems and deficiencies of prior methods and apparatus for the firing of lime, dolomite, magnesite of other material in a stack type furnace and to improve the thermal treatment for such materials by preventing resistance to efficient flowing of the combustion gases in the material column within the furnace chamber, thereby attaining favorable decrease in energy production and costs, especially in the auxiliary air blower, while permitting the reduction in size of the blower.

It is also an object of the invention to maintain in the respective treatment zones within the furnace chamber uniform treatment temperatures and thereby assure decreased heat consumption although attaining satisfactory combustion and improving the thermal efficiency of the furnace.

According to features of the invention, a part of the air which is introduced at the lower end of the furnace chamber is drawn off from the chamber in the cooling zone and is reintroduced into the furnace by encompassing the material column in the furnace above the cooling zone, while the remainder of the introduced air passes on up through the furnace. This attains a number of advantages in that the cooling zone is charged with the entire volume of air needed for combustion of the fuel which is directed into the shaft, so that quick and efficient cooling of the treated material to almost further handling or process temperatures is attained at the discharge end of the furnace chamber. By drawing off part of the air introduced in the lower end of the shaft there is advantageously achieved slower removal of processing heat from the treated material in the chamber above the cooling zone due to the decreased amount of air flowing through this area, whereby in such area satisfactory additional deacidizing entirely to the core region of the individual material grains or particles is assured, thereby achieving maximum recrystalization potential in the product.

According to other features of the invention, the resistance to gas flow in the bulk material column located directly over the cooling zone is lowered considerably so that blower units of lesser performance and smaller size can be used. The air which is removed from the furnace in the cooling zone section can be supplied advantageously as heated combustion air free from flue or discharge gas, directly to the fuel supply means for the combustion zone. This is advantageous because of the improved degree of thermal efficiency, because only the volume of air required for combustion of the fuel need move through the furnace and thereby heat losses in the discharge or flue gases are minimized.

According to further features of the invention, approximately 20 to 40%, with a preferred 30% of the volume of air introduced into the lower end of the furnace is drawn off. This makes possible good adaptation for various types of raw material that the treated material is supplied with the proper processing heat as suited for that material.

Provision is also made for the drawn off air to be cleaned prior to introduction into the combustion zone. Thereby there is advantageously prevented coating of the individual pieces of the material being treated in the combustion zone with a layer of dust from the air which has been drawn off from the cooling zone, whereby quick and efficient transfer of heat from the hot combustion gases to the material is assured. As a result, even heating and deacidizing of the individual pieces of material or grains is assured, substantially improving the efficiency of the furnace.

Provision is also made to take care of those situations wherein the furnace has an additional treatment zone arranged between the combustion zone and the cooling zone, the air that is drawn off being taken from the border area of the cooling zone and the additional treatment zone of the furnace. Through this advantageous arrangement, the combustion air which is directed to the combustion zone is already possessed of such a high heat content that very rapid vaporization of the preferably liquid fuel introduced into the combustion zone is assured. Moreover, a uniform combustion effect across the entire furnace chamber cross section is achieved where solid fuel is used.

Provision is also made according to a further embodiment of the invention for the addition to the drawn off cooling air of fresh air before introduction of the air into the combustion zone of the furnace. This enables in an advantageous and simple manner the achievement of regulation of the drawn off or bypass air temperature so that the optimum combustion air temperature is achieved in the combustion zone. This is especially advantageous if in various stages of the combustion zone different optimum process temperatures are required.

According to a preferred embodiment of the invention, the drawn off or bypass air is directed to intermittently operating supply means for the fuel and/or intermittently operating fuel units which are arranged at the circumference of the furnace. Through this arrangement special advantage is achieved in that across the entire combustion zone in the furnace substantially perfect combustion of the introduced preferably vaporized liquid fuel takes place so that the burning fuel expands within the layers of material to be treated in such a way that any unconsumed combustion air which may have channeled in the center of the furnace is pushed back toward the wall areas of the furnace. Nevertheless, in the areas of the furnace wall optimum combustion of the fuel is achieved so that the frequently heretofore observed formation of soot when employing prior known combustion methods is practically avoided in vertical or stack furnaces according to the present invention. This advantageous feature is implemented by the fuel supplying or feeding units being advantageously arranged in such a way that the unconsumed combustion air in the center of the furnace flows upwardly in the furnace zig-zag fashion so that uniform combustion of the fuel is achieved across the entire cross section of the furnace chamber and thus even temperature distribution is effected and the utmost efficiency in firing of the material being treated can be maintained. By virtue of the uniform temperature distribution the walls of the furnace are protected against and there is avoided the heretofore observable erosion of the customary heat resistant furnace lining due to temperature fluctuations in prior arrangements. In addition, the prior observable silo condition of the bulk material column in the furnace is substantially prevented and uniform treatment of the material is assured across the furnace cross section.

By the feature of the present invention providing for cleaning of the bypass air removed from the furnace by means of blower prior to entering the dust collector, virtually all of the abrasive dust particles which would tend to destroy the blower are removed from such air, whereby economical use of the blower is assured over a long period of operation.

By virtue of the feature of the invention providing for the bypass air to be supplied with fresh air before entering the blower, and providing for adjustment of the volume of such fresh air, temperature of the bypass air is lowered to a level below the maximum admissible blower temperature. Thereby the thermal load of the blower is not exceeded even during long continued operation.

Other objects, features and advantages of the invention will be readily apparent from the following description of a preferred embodiment thereof, taken in conjunction with the accompanying drawing although variations and modifications may be effected without departing from the spirit and scope of the novel concepts embodied in the disclosure, and in which:

The single FIGURE of the drawing is a schematic illustration of a vertical stack or chamber furnace embodying features of the invention.

On reference to the drawing, a calcining furnace 1 is depicted which is of the vertical stack type providing a vertical chamber into the top of which granular and/or lumpy material such as limestone, dolomite, magnesite and the like to be thermally treated is charged by conveying means of conventional type, not shown. The material to be treated forms a column filling the furnace chamber and moving down through a preheating zone V in the upper portion of the furnace, then into a subjacent combustion zone B and finally through a cooling zone K in the lower portion of the furnace from which the finished material is removed by discharging from the lower end of the furnace chamber to be transported away by any preferred removal means, not shown. Air for supporting combustion, as required in the heating of the material M, is introduced into the furnace chamber from below, as depicted by the directional arrows L and enters first into the cooling zone K and the still hot material in order to cool the material. For efficiency in cooling the material in the zone K and preheating the air for efficient promotion of combustion in the combustion zone B and then preheating of the material in the zone V, suitable suction fan or blower means are desirably associated with the top of the stack, as is well known and therefore not illustrated in detail.

In order to implement the feature of withdrawing and bypassing some of the cooling air from the furnace at the cooling zone K and returning the bypassed air to the combustion zone B, means comprising a manifold 7 are provided in encircling relation to the furnace 1 about the upper portion of the cooling zone K, and preferably at a secondary treatment zone N arranged between the combustion zone B and the cooling zone K, with an annular series of outlet ports 7a effecting communication between the stack chamber of the furnace 1 and the manifold 7. Although it is preferred to withdraw cooling air from the furnace stack at the secondary treatment zone N, if preferred the air may be withdrawn from the cooling zone K at areas thereof which have a lower temperature than in the secondary treatment zone. In a preferred arrangement, from about 20 to about 40% of the air L may be withdrawn through the manifold 7, with the preferred volume of air withdrawn being about 30%. The remaining air L flows from the cooling zone K on through the furnace chamber progressively through the combustion zone B and the preheating zone V together with the bypass air which is reintroduced into the combustion zone B, and is then removed by the suction blower means as exhaust gas from the furnace.

Means for effecting air withdrawing suction through the manifold 7 desirably comprise a conveyer blower 2 delivering into an air duct 3 extending upwardly outside of the furnace 1 to the vicinity of the combustion zone B. Preferably the bypass air is cleaned prior to entry into the blower 2 by passage through a dust collector 4, thereby reaching the dust collector substantially free from deleterious dust particles. For maintaining maximum admissible blower temperature, fresh cooling air may be supplied to the blower 2 under the control of a damper 5 through a tubular inlet 6 communicating with the suction passage to the blower 2 from the dust collector 4. For balancing the additional cooling air volume with the volume of bypass air, the damper 5 may be correlated in operation with a bypass air control damper 8 in a take-off duct 7b leading from the manifold 7 and communicating with a delivery dust 4a communicating with the dust collector 4.

Bypass air is pumped by the blower 2 into the duct 3 serving as a manifold for distributing the bypass air into the combustion zone B at a plurality of levels, herein shown as three by means of intermittently operating fuel introducing means including fuel supplying manifolds 9 encircling the furnace 1 and communicating with the combustion zone B through respective fuel introducing ports 9a which are desirably staggered in each series relative to the ports in the adjacent series. Leading off from the manifold duct 3 are respective branch passages 10 communicating with the manifolds 9. Each of the branch passages 10 is desirably provided with means for controlling the temperature of the bypass gases delivered therethrough so that the lowermost manifold 9 will receive bypass gas of the lowest combustion temperature and the manifolds 9 thereabove will receive the bypass gas at progressively higher combustion temperatures so that the uppermost manifold will have the highest temperature. Such temperature control is conveniently effected by fresh cooling air introduced into the respective branch passages 10 through respective tubular inlets 11 controlled by means of valves such as dampers 12 which are individually adjustable. Preferably liquid fuel is supplied to the fuel manifolds 9 from a suitable source F, although it may be powdered solid fuel. The fuel supplied from the source F may be controlled by means such as valves 9b to effect the intermittent fuel introduction function of the fuel introducing means, attaining a pressure thrust fuel injection arrangement.

By virtue of the described arrangement, the respective subzones within the combustion zone B to which the fuel manifolds 9 supply vaporized fuel are so controlled that as the burning fuel expands into the bulk material column within the furnace, the air which has continued on from the cooling zone K into the combustion zone B, generally concentrated in the core of the material column, is displaced toward the wall areas within the furnace chamber. Upward movement of the combustion air is, by reason of the staggered relation of the supply ports 9a, substantially zig-zag fashion. As a result of the expansion and agitation of the air along the wall areas of the furnace, a sufficiently high order of combustion air is provided for practically soot-free combustion, with substantially uniform combustion temperatures across the entire section of the column of material being treated in the furnace chamber.

Although a single bypass air take-off manifold 7 has been shown, it is within the scope of the present invention to effect bypass air withdrawal from several levels of the cooling zone K simultaneously and to reintroduce the bypass air through a common bypass air line through the combustion zone B. Where a plurality of the manifolds 7 are used at various levels of the cooling zone K, each may be provided with its own control means 8 such as adjustable or pivotal plate dampers so that temperature of the bypass air can be controlled throughout a wide range.

It will be understood that variations and modifications may be effected without departing from the spirit and scope of the novel concepts of this invention.

I claim as my invention:

1. A method of thermal treatment of granular and/or lumpy material, in particular for calcining of limestone, dolomite, magnesite, and the like, in a vertical tubular wall stack furnace chamber, and including loading the material to be treated into the top of the furnace chamber to move as a column downwardly throughout the length of the chamber, introducing air into the column into the lower end of the furnace chamber and effecting counterflow movement of the air upwardly in the furnace chamber through a cooling zone in the lower part of the chamber and then through a combustion zone in an intermediate part of the chamber and thereabove through a preheating zone in the upper part of the chamber, the improvement comprising:

withdrawing a minor preheated part of the volume of air which is introduced into the cooling zone, while permitting the major remaining volume of the air to flow on upwardly through the material column in the furnace chamber;

introducing through the wall of the furnace stack about the combustion zone fuel to support combustion in the combustion zone; and returning substantially all of the withdrawn preheated air into the combustion zone with the fuel to enhance combustion efficiency in the combustion zone.

2. A method according to claim 1, comprising withdrawing from the cooling zone and returning with the fuel in the combustion zone about 22 to 40%, and optimally about 30% of the volume of air introduced into the bottom of the furnace chamber.

3. A method according to claim 1, comprising cleaning the withdrawn air prior to returning the air with the fuel into the combustion zone.

4. A method according to claim 1, effecting said withdrawing of air from an area between the cooling zone and a secondary treatment zone located between said cooling zone and said combustion zone.

5. A method according to claim 1, including supplying fresh air into the withdrawn air before introducing the withdrawn air with the fuel into the combustion zone.

6. A method according to claim 1, comprising directing the withdrawn air to intermittently operating fuel feeding units and thereby returning the withdrawn air with the fuel to the combustion zone.

7. A method according to claim 1, comprising introducing the fuel intermittently into the combustion zone at a plurality of vertically spaced levels and at respective staggered points with respect to the wall of the furnace stack about the combustion zone, and thereby agitating the combustion and upwardly moving remaining air into generally zig-zag upward movement in and through the column of material.

8. A method according to claim 1, comprising effecting said withdrawing of air through a blower device, and cleaning the withdrawn air prior to entry of the withdrawn air into the blower device.

9. A method according to claim 8, comprising adding fresh air to the cleaned withdrawn air prior to entry of the air into the blower device, and adjusting the volume of fresh air and thereby maintaining the temperature of the cleaned withdrawn air at a point below the maximum admissible temperature within the blower device.

10. A method according to claim 1, comprising introducing the withdrawn air into a plurality of vertically spaced fuel supply manifolds encircling the combustion zone, and introducing the fuel and air into the combustion zone from said manifolds.

11. A method according to claim 10, comprising controlling the temperature of the withdrawn air to be progressively higher in the manifolds from the lowest upwardly to the highest manifold.

12. A method according to claim 10, comprising feeding the withdrawn air and fuel as a mixture from the manifolds into the combustion zone through ports which are relatively staggered in each manifold relative to the ports of an adjacent manifold.

13. A method thermal treatment of granular and/or lumpy material, in particulr for calcining of limestone, dolomite, magnesite, and the like, in a vertical tubular wall stack furnace chamber, and including loading the material to be treated into the top of the furnace chamber to move as a column downwardly throughout the length of the chamber, introducing air into the column into the lower end of the furnace chamber and effecting counterflow movement of the air upwardly in the furnace chamber through a cooling zone in the lower part of the chamber and then through a combustion zone in an intermediate part of the chamber and thereabove through a preheating zone in the upper part of the chamber, the improvement comprising:

withdrawing from the furnace chamber a minor preheated part of the volume of air which is introduced into the cooling zone in the chamber, while permitting the major remaining volume of the air to flow on upwardly through the material column in the furnace chamber;

introducing fuel into the material column in the combustion zone intermittently at a plurality of different points; returning withdrawn preheated air into the combustion with said fuel; and effecting agitation of the upwardly moving air and burning fuel within the combustion zone as a result of the intermittent fuel feeding.

14. A method according to claim 13, comprising withdrawing from the cooling zone and returning with the fuel in the combustion zone about 22 to 40%, and optimally about 30% of the volume of air introduced into the bottom of the furnace chamber.

15. A method according to claim 13, effecting said withdrawing of air from an area between the cooling zone and a secondary treatment zone located between said cooling zone and said combustion zone.

16. A method according to claim 13, comprising effecting said withdrawing of air through a blower device, adding fresh air to the withdrawn air prior to entry of the air into the blower, and adjusting the volume of fresh air and maintaining the temperature of the withdrawn air at a point below the maximum admissible blower temperature.

17. A method according to claim 13, comprising introducing the withdrawn air into the combustion zone through said points disposed in circumferential series about said combustion zone at different heights and offset with respect to one another at the different heights.

18. A method according to claim 17, comprising controlling the temperature of the withdrawn air to be progressively higher at the fuel and air introduction points from the lowest upwardly to the highest.

19. In an apparatus for the thermal treatment of granular and/or lumpy material, and in particular for calcining limestone, dolomite, magnesite, and the like, and including a vertical tubular wall stack furnace having a vertical chamber into the upper end of which material to be treated is introduced to provide a downwardly moving column of the material within the chamber, and means for upward movement of air from the lower end of the chamber to move upwardly countercurrent to the movement of the column of material, the chamber providing a preheating zone for the column in the upper part of the chamber, a cooling zone for the column in the lower part of the chamber, and a combustion zone for the column in the intermediate portion of the chamber between the preheating and cooling zones, the cooling air entering through the lower end of the chamber into the lower end of the cooling zone and moving upwardly therein, the improvement comprising:

means for withdrawing a minor preheated part of the upwardly flowing air from the cooling zone, but permitting the major remaining volume of the air to flow on upwardly through the material column in the chamber;

means for introducing fuel to support combustion through the wall of the furnace stack into said combustion zone; and means for returning substantially all of the air withdrawn by said withdrawing means into the chamber at the combustion zone with the fuel introduced by said introducing means whereby to enhance combustion efficiency in the combustion zone.

20. In an apparatus according to claim 19, means for controlling said withdrawing means to withdraw about 24 to 40%, with an optimum of about 30%, of the volume of air entering the lower end of the furnace chamber.

21. In an apparatus according to claim 19, means for cleaning the withdrawn air prior to returning it to the chamber at the combstion zone by means of said returning means.

22. In an apparatus according to claim 19, the furnace chamber including a secondary treatment zone between the combustion zone and the cooling zone, and said air withdrawing means communicating with the chamber adjacent to juncture of said cooling zone and the secondary treatment zone.

23. In an apparatus according to claim 19, means for introducing fresh air into the withdrawn air prior to the return of the withdrawn air with the fuel at the combustion zone.

24. In an apparatus according to claim 19, said fuel introducing means comprising intermittently operating burner ports in the stack wall about the combustion zone within the chamber, and said returning means communicating with said fuel feeding means to return the withdrawn air into the chamber at the combustion zone through said ports.

25. In an apparatus according to claim 19, a blower operating to effect air movement for said withdrawing means, and means for cleaning the withdrawn air prior to entry into the blower.

26. In an apparatus according to claim 25, means for adding fresh air to the withdrawn air prior to entry of the withdrawn air into the blower, and means for adjusting the volume of fresh air so that the temperature of the withdrawn air is maintained below the maximum admissible blower temperature.

27. In an apparatus according to claim 19, said fuel introducing means including a plurality of vertically spaced fuel supply manifolds encircling the furnace chamber about the combustion zone and feeding thereinto, and said withdrawing means delivering the withdrawn air to said manifolds.

28. In an apparatus according to claim 27, said manifolds having respective series of circumferentially spaced ports opening into the chamber at the combustion zone, said series of ports being relatively staggered in each manifold relative to an adjacent manifold.

29. In an apparatus according to claim 27, means for controlling the temperature of the withdrawn air to be progressively higher in the manifolds from the lowest upwardly to the highest manifold.

30. In an apparatus for the thermal treatment of granular and/or lumpy material, and in particular for calcining limestone, dolomite, magnesite, and the like, and including a vertical tubular wall stack furnace having a vertical chamber into the upper end of which material to be treated is introduced to provide a downwardly moving column of the material within the chamber, and means for upward movement of air from the lower end of the chamber to move upwardly countercurrent to the movement of the column of material, the chamber providing a preheating zone for the column in the upper part of the chamber, a cooling zone for the column in the lower part of the chamber, and a combustion zone for the column in the intermediate portion of the chamber between the preheating and cooling zones, the cooling air entering through the lower end of the chamber into the lower end of the cooling zone and moving upwardly therein upwardly through the column in the chamber, the improvement comprising:

means for withdrawing a minor preheated part of the upwardly flowing air from the cooling zone, but permitting the major remaining volume of the air to flow on upwardly through the material column in the chamber;

means for introducing fuel into the material column in the combustion zone within said chamber intermittently at a plurality of different points, and means for returning withdrawn preheated air into the combustion zone with said fuel;

said means for introducing fuel intermittently effecting agitation of the upwardly moving air and burning fuel within the combustion zone as a result of the intermittent fuel feeding.

31. In an apparatus according to claim 30, means for controlling said withdrawing means to withdraw about 24 to 40%, with an optimum of about 30%, of the volume of air entering the lower end of the furnace chamber.

32. In an apparatus according to claim 30, the furnace chamber including a secondary treatment zone between the combustion zone and the cooling zone, and said air withdrawing means communicating with the chamber adjacent to juncture of said cooling zone and the secondary treatment zone.

33. In an apparatus according to claim 30, comprising a blower device for effecting movement through said means for withdrawing air, means for adding fresh air to the withdrawn air prior to entry of the air into the blower, and means for controlling the flow of fresh air to maintain the temperature of the withdrawn air at a point below a maximum admissible blower temperature before it reaches the blower.

34. In an apparatus according to claim 30, said points through which the withdrawn air is introduced into the combustion zone being disposed in circumferential series about said combustion zone at different heights and offset relative to one another at said different heights.

35. In an apparatus according to claim 34, means for controlling the temperature of the withdrawn air to be progressively higher at the fuel and air introduction points from the lowest upwardly to the highest along said combustion zone.

* * * * *